(12) United States Patent
Kishimoto et al.

(10) Patent No.: US 11,754,509 B2
(45) Date of Patent: Sep. 12, 2023

(54) METHOD FOR INSPECTING METAL SEPARATOR

(71) Applicant: HONDA MOTOR CO., LTD., Tokyo (JP)

(72) Inventors: Masaaki Kishimoto, Tokyo (JP); Satoshi Hasegawa, Tokyo (JP); Daigo Mukasa, Tokyo (JP); Koya Shimada, Tokyo (JP); Miho Asano, Tokyo (JP)

(73) Assignee: Honda Motor Co., Ltd., Tokyo (JP)

( * ) Notice: Subject to any disclaimer, the term of this patent is extended or adjusted under 35 U.S.C. 154(b) by 75 days.

(21) Appl. No.: 17/677,380

(22) Filed: Feb. 22, 2022

(65) Prior Publication Data

US 2022/0299447 A1  Sep. 22, 2022

(30) Foreign Application Priority Data

Mar. 16, 2021 (JP) ................................. 2021-042394

(51) Int. Cl.
*G01N 21/95* (2006.01)
*H01M 8/0297* (2016.01)
*G01N 21/88* (2006.01)

(52) U.S. Cl.
CPC ......... *G01N 21/95* (2013.01); *G01N 21/8851* (2013.01); *H01M 8/0297* (2013.01)

(58) Field of Classification Search
CPC .............. G01N 21/95; G01N 21/8851; H01M 8/0297
See application file for complete search history.

(56) References Cited

U.S. PATENT DOCUMENTS

2018/0226665 A1*  8/2018  Oyama ............... H01M 8/1004

FOREIGN PATENT DOCUMENTS

JP  2018-125258 A  8/2018

* cited by examiner

*Primary Examiner* — Jamil Ahmed
(74) *Attorney, Agent, or Firm* — Carrier, Shende & Associates P.C.; Joseph P. Carrier; Fulchand P. Shende

(57) ABSTRACT

A method for inspecting a metal separator includes a step of detecting deflection of the metal separator with a height detector, a step of displacing the metal separator or an imaging device in a height direction according to the deflection of the metal separator to keep a distance between the imaging device and an imaging portion of the metal separator constant, and a step of imaging a weld portion with the imaging device.

3 Claims, 7 Drawing Sheets

METHOD FOR INSPECTING METAL SEPARATOR

CROSS-REFERENCE TO RELATED APPLICATIONS

This application is based upon and claims the benefit of priority from Japanese Patent Application No. 2021-042394 filed on Mar. 16, 2021, the contents of which are incorporated herein by reference.

BACKGROUND OF THE INVENTION

Field of the Invention

The present invention relates to a method and an apparatus for inspecting a metal separator used in a fuel cell.

Description of the Related Art

JP 2018-125258 A discloses the following matters for assembling a metal separator. Two metal separators are prepared in which an uneven structure corresponding to a bead seal or a flow path groove is formed by press forming. The metal separators are assembled by stacking the two metal separators in the thickness direction and welding them.

A weld portion of the metal separators is disposed along a flat surface contact portion adjacent to a convex structure constituting a refrigerant flow path and a bead seal. Such welds may have discontinuities or holes passing through the metal separator caused by welding defects. Such welding defects may cause gas (e.g., fuel gas) to leak from one surface of the metal separator to the other surface of the metal separator.

SUMMARY OF THE INVENTION

Therefore, it is necessary to inspect whether or not the weld portion of the metal separators is appropriately welded. However, the weld portion of the metal separator is minute. For this reason, when visual inspection using a camera is performed, it is necessary to optically enlarge the weld portion. Such an optical system has a shallow depth of focus and needs to keep a distance constant between an object and a camera with high accuracy.

However, since the metal separator is formed of a thin metal plate, deflection or undulation occurs in a planar direction. As a result, the height of the flat portion having the weld portion is usually not constant. Therefore, every time the height of the weld portion changes, it is necessary to perform focus adjustment by controlling the optical system of the camera. It takes a long time for a conventional inspection method to complete focus adjustment. For this reason, there is a problem that the inspection process requires a long time and the productivity is low.

Therefore, an object of the present invention is to provide a method and an apparatus for inspecting a metal separator that are capable of quickly inspecting the appearance of a weld portion.

One aspect of the following disclosure is a method for inspecting a metal separator that is formed by a first separator and a second separator welded to each other, the method including: a step of positioning an imaging portion of an imaging device at a weld portion of the metal separator; a step in which a height detector detects deflection of the metal separator in the vicinity of the imaging portion of the imaging device, and a driving device displaces the metal separator or the imaging device in a height direction according to the deflection of the metal separator, whereby a distance between the imaging device and the imaging portion of the metal separator is kept constant; and a step of capturing an image of the weld portion with the imaging device.

According to another aspect of the present invention, there is provided an apparatus for inspecting a metal separator, the apparatus comprising: a stage device that supports a metal separator of a fuel cell; an imaging device that images a weld portion of the metal separator; a height detector that detects deflection of the metal separator in the vicinity of the weld portion; and a driving mechanism that displaces the stage device in a height direction in accordance with a detection result of the height detector and keeps a distance between the imaging device and the weld portion constant.

The method for inspecting the metal separator and the apparatus for inspecting the metal separator according to the above-described aspects do not rely on the focusing function of the imaging device, but displace at least one of the metal separator and the imaging device in the vertical direction based on the detection result of the height detector. Thus, the method for inspecting the metal separator and the device for inspecting the metal separator can speed up the visual inspection of the weld portion using the imaging device.

The above and other objects, features, and advantages of the present invention will become more apparent from the following description when taken in conjunction with the accompanying drawings, in which a preferred embodiment of the present invention is shown by way of illustrative example.

DESCRIPTION OF THE INVENTION

Figure 2:
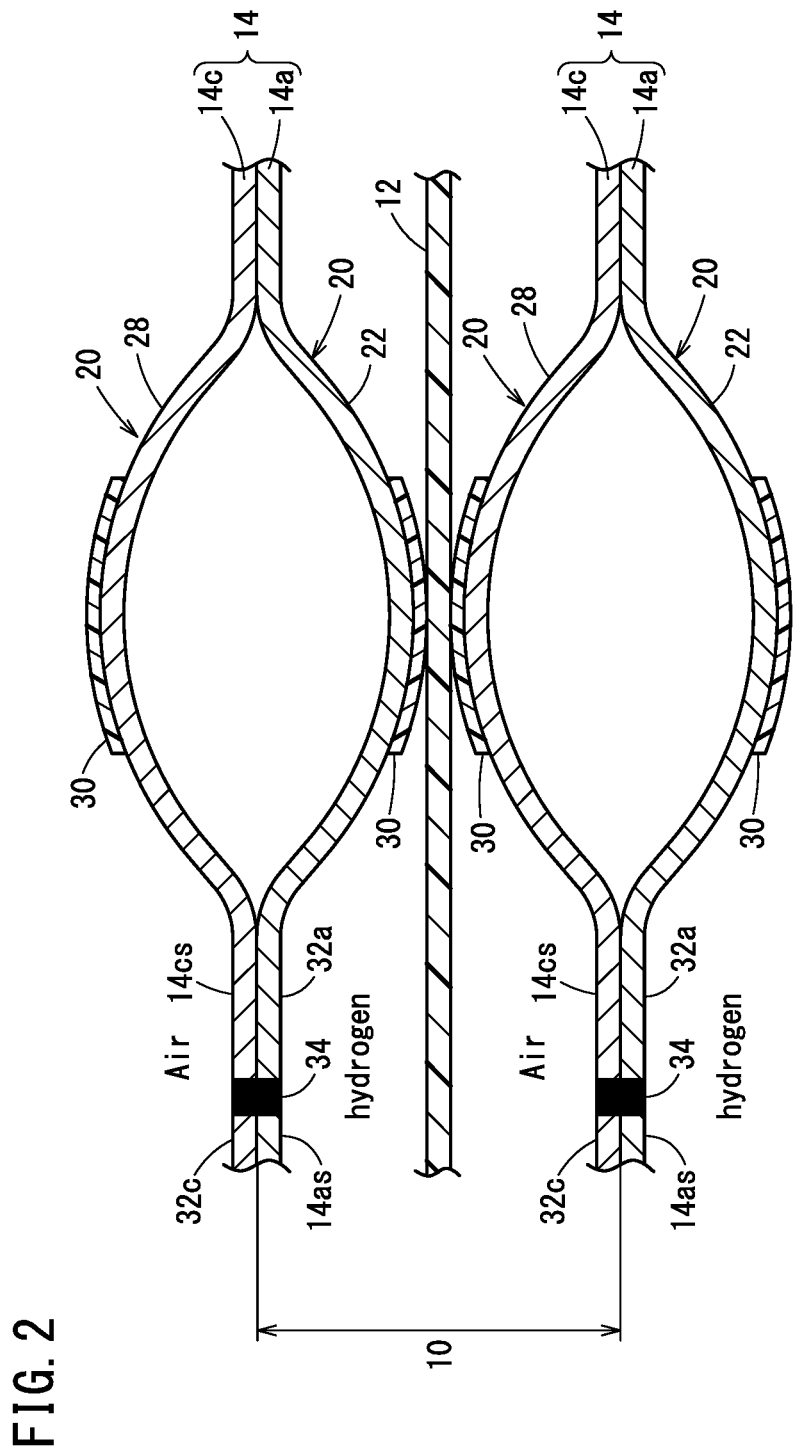
FIG. 2 is a cross-sectional view of a bead seal and a weld portion of FIG. 1.

As shown in FIG. 2, a power generating cell 10 includes a membrane electrode assembly (MEA) 12 and metal separators 14 (bipolar plates) disposed on both sides of the MEA 12. Typically, a fuel cell stack has a predetermined number of stacked power generating cells 10. The fuel cell stack is incorporated into, for example, a fuel cell vehicle (such as a fuel cell electric vehicle) as an in-vehicle fuel cell stack.

The membrane electrode assembly (MEA) 12 shown in FIG. 2 includes an electrolyte membrane made up from a polymer ion exchange membrane. An anode electrode is disposed on one surface of the electrolyte membrane. A cathode electrode is disposed on the other surface of the electrolyte membrane. The MEA 12 of the present embodiment may have a frame-shaped plastic film bonded to the outer peripheral portion of the electrolytic membrane.

Figure 1:
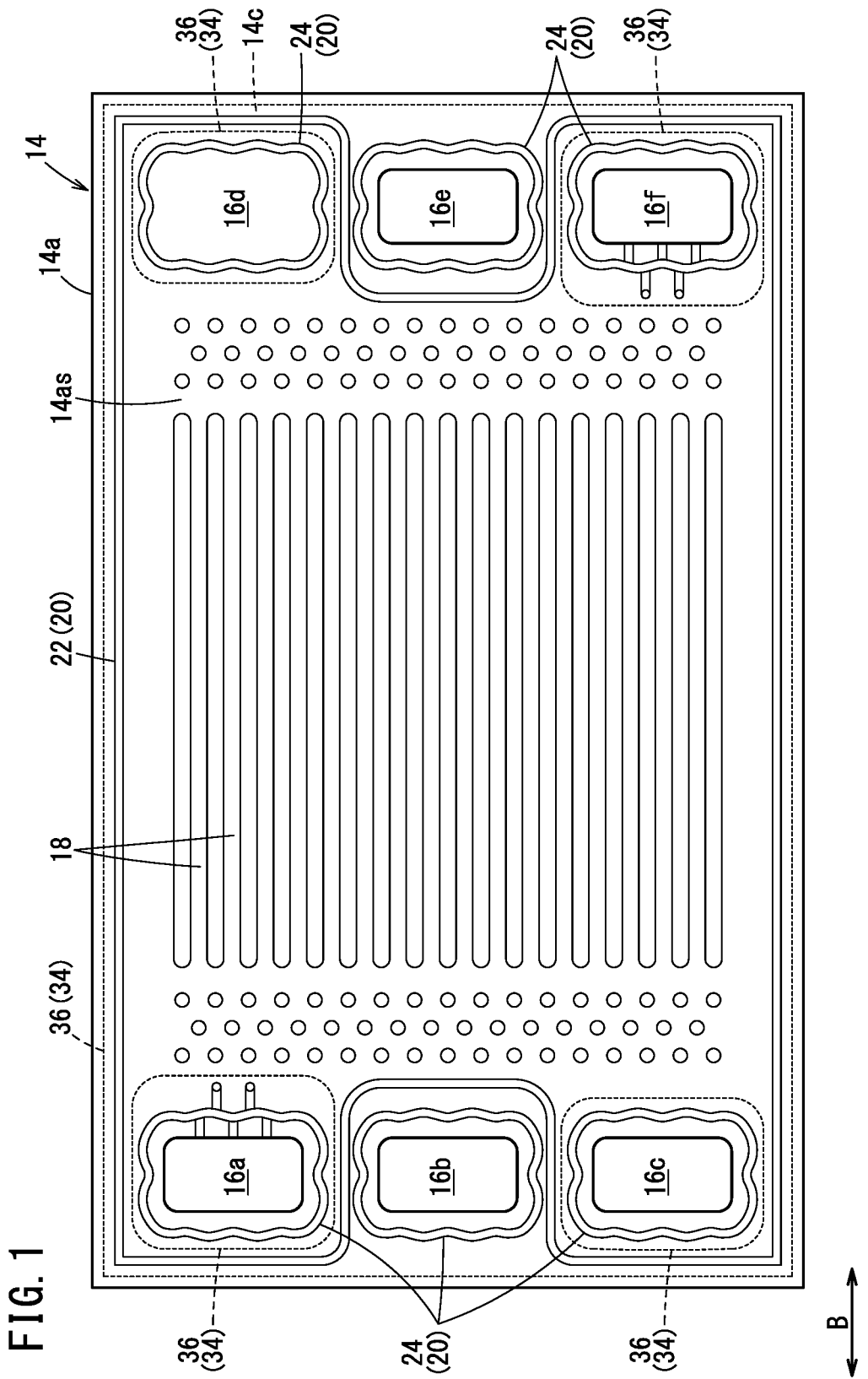
FIG. 1 is a plan view of a metal separator to be inspected.

In the power generating cell 10, the MEA 12 is sandwiched by the metal separators 14 shown in FIG. 1. The metal separator 14 facing the anode electrode of the MEA 12 is also referred to as a "first separator 14a". The metal separator 14 facing the cathode electrode of the MEA 12 is also referred to as a "second separator 14c". Each of the first separator 14a and the second separator 14c has, for example, a horizontally long (or vertically long) rectangular shape.

Each of the first separator 14a and the second separator 14c is, for example, a steel plate, a stainless steel plate, an aluminum plate, a plated steel plate, or a metal thin plate whose metal surfaces are subjected to anti-corrosive surface treatment, and is obtained by press-forming a cross section of the plate into a corrugated shape. As shown in FIG. 2, the first separator 14a and the second separator 14c are stacked in the thickness-wise direction and integrally bonded to each other to form one metal separator 14.

As shown in FIG. 1, a surface 14as of the first separator 14a facing the MEA 12 has a fuel gas flow field 18. The fuel gas flow field 18 communicates with a communication hole 16a into which the fuel gas flows and a communication hole 16f from which the fuel gas flows. In particular, the fuel gas flow field 18 is formed between the first separator 14a and the MEA 12. The fuel gas flow field 18 has a plurality of linear flow grooves (or wavy flow grooves) extending in the direction of arrow B.

The surface 14as of the first separator 14a facing the MEA 12 has a bead seal 20 formed by press forming. The bead seal 20 prevents leakage of fluid (fuel gas, oxygen-containing gas, or coolant). The bead seal 20 includes an outer bead seal 22 that surrounds an outer peripheral portion of the first separator 14a and a plurality of communication hole bead seals 24 that surround the communication holes 16a to 16f. The bead seal 20 bulges (projects) toward the MEA 12 and abuts against the MEA 12 in an air-tight and liquid-tight manner.

As shown in FIG. 2, a bead seal 20 for preventing leakage of fluid is also formed on a surface 14cs of the second separator 14c facing the MEA 12. The bead seal 20 of the second separator 14c is disposed to face the bead seal 20 of the first separator 14a. Among the bead seal 20 of the second separator 14c, the bead seal 20 provided to face the outer bead seal 22 of the first separator 14a is an outer bead seal 28 of the second separator 14c.

Although not particularly illustrated, an oxygen-containing gas flow field including a plurality of linear flow grooves (or wavy flow grooves) extending in the direction indicated by the arrow B is provided on a surface 14cs of the second separator 14c facing the MEA 12, similarly to the fuel gas flow field 18 in FIG. 1. The oxygen-containing gas flow field communicates with a communication hole 16d into which the oxygen-containing gas flows and a communication hole 16c from which the oxygen-containing gas flows in FIG. 1.

As shown in FIG. 2, a sealing member 30 made up from a flexible material such as resin may be provided at the top of the bead seal 20.

The first separator 14a and the second separator 14c are in close contact with each other at flat portions 32a and 32c adjacent to the bead seal 20. The flat portions 32a and 32c are integrally joined by a weld portion 34 located at a predetermined position.

The weld line 36 in FIG. 1 has a weld portion 34 (see FIG. 2) that extends in a punctiform or linear manner. As shown, the weld line 36 is located outside the outer bead seal 22 and outside the communication hole bead seal 24 surrounding the holes 16a, 16c, 16d, 16f. The weld line 36 closes a space between the first separator 14a and the second separator 14c in a liquid-tight and air-tight manner.

In the metal separator 14 as described above, when a defect occurs in the weld portion 34, a hole penetrating the metal separator 14 in the thickness direction or a break of the weld line 36 may be formed. Such a hole or break allows hydrogen gas or air to leak. Therefore, in the manufacturing process of the metal separator 14, after the first separator 14a and the second separator 14c are welded to each other, an appearance inspection of the weld portion 34 is performed.

Hereinafter, the inspection apparatus 40 for the metal separator 14 according to the present embodiment will be described.

Figure 3:
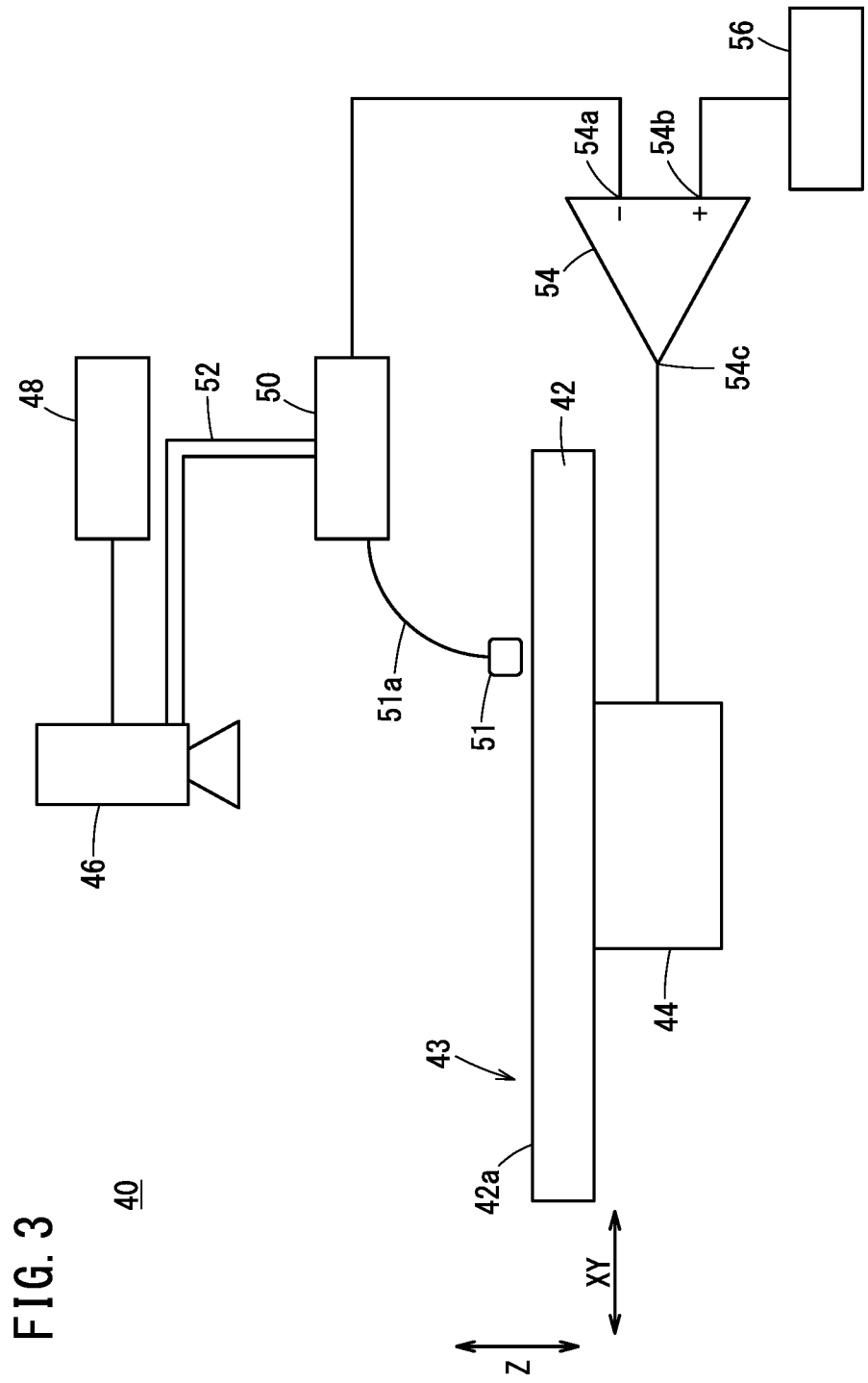
FIG. 3 is a schematic configuration diagram of an apparatus for inspecting a metal separator according to the first embodiment.

As shown in FIG. 3, the inspection apparatus 40 includes, as main components, a stage device 43, an imaging device 46, an image processing unit 48, a height detector 50, and a height control circuit 54. The stage device 43 includes a stage 42 that supports the metal separator 14 and a stage driver 44 that displaces the stage 42.

The stage 42 has a main surface 42a parallel to the horizontal direction (the arrow XY direction in FIG. 3). The metal separator 14 is placed on the main surface 42a. During inspection, the stage 42 holds the metal separator 14 and moves integrally with the metal separator 14. A stage driver 44 is attached to the stage 42. The stage driver 44 displaces the stage 42 (main surface 42a) horizontally and vertically (direction of arrow Z in FIG. 3). The vertical direction is a height direction. The stage driver 44 drives the stage 42 in the horizontal direction so that the imaging position of the imaging device 46 moves along the weld line 36 of the metal separator 14. In addition, the stage driver 44 displaces the stage 42 in the vertical direction (arrow Z direction) based on a control signal from the height control circuit 54 generated based on the deflection of the metal separator 14.

The imaging device 46 is, for example, a camera. The imaging device 46 is disposed above the stage 42 and faces the stage 42. The optical axis of the imaging device 46 (the center of an imaging range) is arranged in a direction substantially perpendicular to the main surface 42a of the stage 42. The imaging device 46 is supported by a frame 52 that is independent of the stage 42. The frame 52 also fixes the height detector 50. Therefore, the positional relationship between the imaging device 46 and the height detector 50 is kept constant, and the positional relationship between the imaging device 46 and the height detector 50 does not change.

The imaging device 46 captures an image of the metal separator 14 placed on the main surface 42a of the stage 42. The imaging device 46 acquires image data of the weld portion 34 and outputs the image data to the image processing unit 48. The imaging device 46 images the weld portion 34 at a fixed focal length. Note that the imaging device 46 may have a function of automatically performing focusing based on the image data. The image processing unit 48 detects a welding defect such as a hole in the weld portion 34 or a break in welding based on the image data of the weld portion 34.

The height detector 50 includes an arm 51a and a sensor. The tip of the arm 51a has a contact 51 abutting on the surface of the metal separator 14. The sensor detects deformation of the arm 51a. The contact 51 of the height detector 50 is disposed so as to abut on the surface of the metal separator 14 in the vicinity of the imaging site of the imaging device 46. When the metal separator 14 is bent upward, the arm 51a is deformed through the contact 51. The height detector 50 outputs a detection value corresponding to the deformation of the arm 51a. That is, the height detector 50 outputs a detection value corresponding to the deflection of the metal separator 14.

The height control circuit 54 is a circuit that outputs a feedback signal to the stage driver 44 so that the detection value of the height detector 50 is maintained at a constant value set in a reference circuit 56. Although not particularly limited, the height control circuit 54 is a differential amplifier circuit. In this case, when an output terminal of the height detector 50 is connected to an inverting input terminal 54a of the height control circuit 54, a feedback loop is formed that keeps constant the distance between the imaging device 46 and the metal separator 14. The reference circuit 56 is connected to a non-inverting input terminal 54b of the height control circuit 54. The output value of the reference circuit 56 is set in a manner that the position of the imaging device 46 is maintained at an appropriate position.

That is, in a case where the height of the contact portion of the contact 51 increases due to the deflection of the metal separator 14, the output signal of the height detector 50 increases. When the output signal of the height detector 50 increases, the height control circuit 54 outputs a control signal for lowering the stage 42 downward from the output terminal 54c to the stage driver 44. In addition, when the height of the contact portion of the contact 51 decreases due to the deflection of the metal separator 14, the output signal of the height detector 50 decreases. When the output signal of the height detector 50 falls below the output value of the reference circuit 56, the height control circuit 54 outputs a control signal for displacing the stage 42 upward to the stage driver 44. In this way, the height control circuit 54 controls the distance between the imaging device 46 and the metal separator 14 to be kept constant during inspection. The height control circuit 54 may be constituted by a microcomputer having the same function.

Next, a method of inspecting the metal separator 14 using the inspection apparatus 40 will be described.

Figure 5:
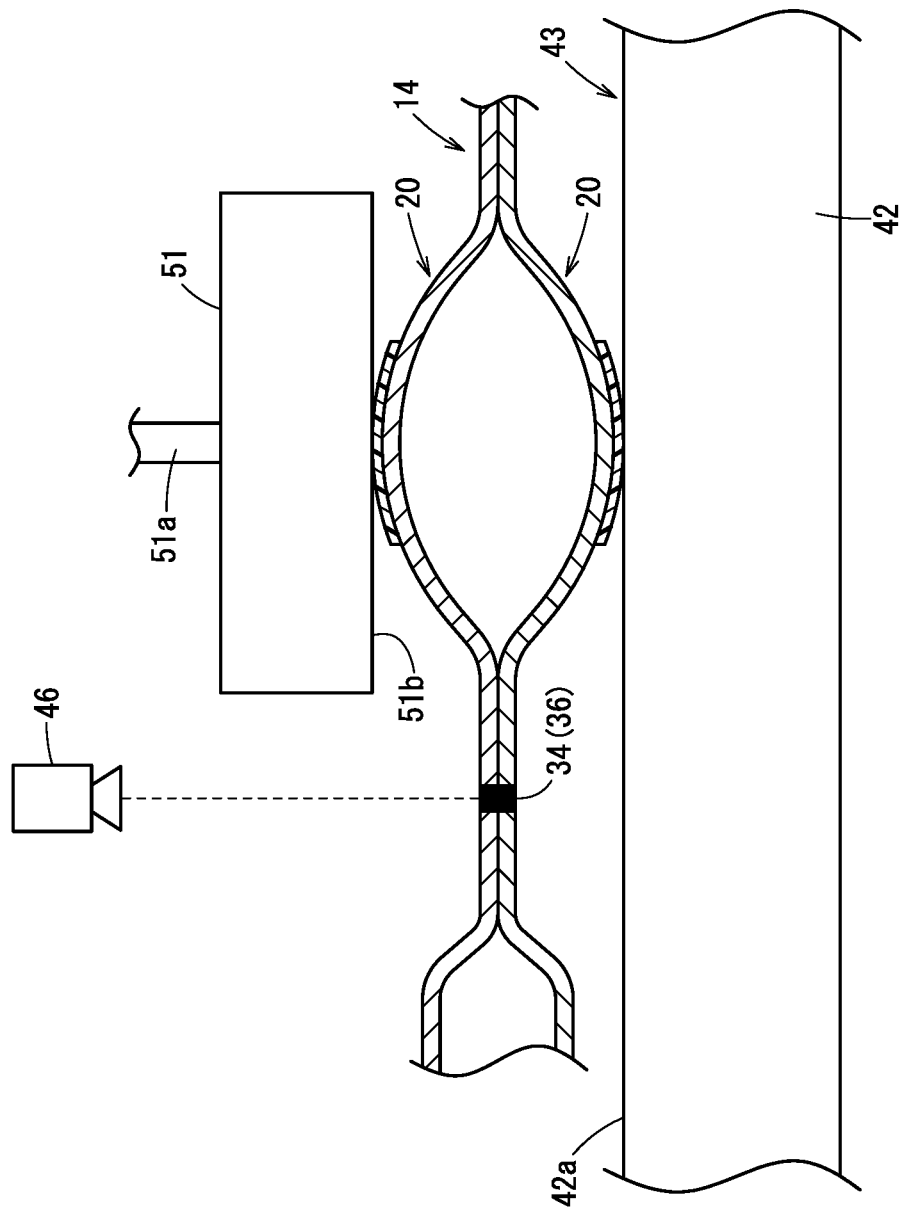
FIG. 5 is an explanatory diagram showing a positional relationship between a contact and a weld portion of a height detector of FIG. 3.

First, the metal separator 14 to be inspected is placed on the main surface 42a of the stage 42 of the inspection apparatus 40. As shown in FIG. 5, the contact 51 of the height detector 50 has a flat contact surface 51b. In a case where the metal separator 14 is placed on the main surface 42a of the stage 42, the contact surface 51b of the contact 51 comes into contact with the bead seal 20 of the metal separator 14.

Figure 4:
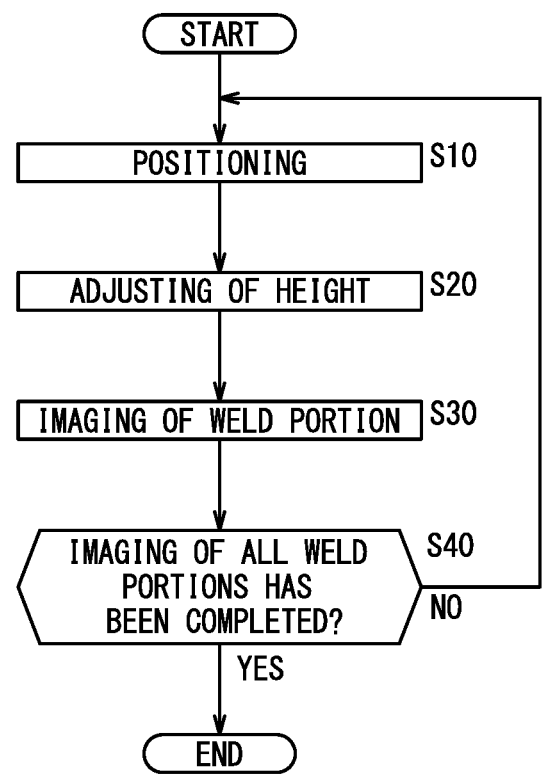
FIG. 4 is a flowchart illustrating a method for inspecting a metal separator according to an embodiment.

Next, in step S10 of FIG. 4, the inspection apparatus 40 performs positioning. Here, the stage driver 44 drives the stage device 43 to align the position of the optical axis (the center of the imaging range) of the imaging device 46 with the weld portion 34 (see FIG. 2) of the metal separator 14.

Next, in step S20, the inspection apparatus 40 detects the deflection of the metal separator 14 in the imaging range, and adjusts the height of the stage device 43 according to the deflection of the metal separator 14. In the present embodiment, the contact 51 of the height detector 50 shown in FIG. 5 detects local deflection of the metal separator 14. Specifically, the height detector 50 detects the height of the bead seal 20 by bringing the contact 51 into contact with the bead seal 20. In order to ensure airtightness, the bead seal 20 is formed with high accuracy so that the protruding height from the flat portion is constant. Therefore, the height of the top portion of the bead seal 20 accurately matches the deflection (displacement in the height direction) of the metal separator 14. Therefore, the height detector 50 can accurately detect the deflection of the metal separator 14 by detecting the height of the top portion of the bead seal 20.

The contact surface 51b is formed on the bottom of the contact 51. The width of the contact surface 51b is wider than that of the bead seal 20. Therefore, even if the center position of the contact 51 is deviated from the top portion of the bead seal 20, the height detector 50 can detect the height of the top portion of the bead seal 20. Therefore, even if the accuracy of the arrangement position of the contact 51 is low, the height of the top portion of the bead seal 20 can be easily detected.

Thereafter, based on the output value of the height detector 50, the height control circuit 54 outputs a control signal to the stage driver 44 of the stage device 43. The height of the stage 42 is adjusted until the output value of the height detector 50 coincides with the reference value of the reference circuit 56.

Next, in step S30, the imaging device 46 images the weld portion 34 and outputs the image data to the image processing unit 48. The image processing unit 48 detects a defect of the weld portion 34 based on the image data.

Next, in step S40, the inspection apparatus 40 determines whether or not imaging of all the weld portions 34 has been completed. In a case where the inspection apparatus 40 determines that imaging of all the weld portions 34 has not been completed (step S40: NO), the process returns to step S10 and the inspection apparatus 40 moves the imaging portion to the next weld portion 34. In addition, in step S40, in a case where the imaging device 46 determines that imaging of all the weld portions 34 has been completed (step S40: YES), the inspection apparatus 40 ends the appearance inspection of the metal separator 14.

As described above, in the inspection method of the metal separator 14 using the inspection apparatus 40, the height of the weld line 36 changes while the optical axis of the imaging device 46 moves along the weld line 36 due to the deflection of the metal separator 14. In the inspection apparatus 40 according to the present embodiment, the contact 51 of the height detector 50 detects the height of the weld line 36. Based on a control signal of the height control circuit 54, the stage driver 44 displaces the stage 42 in the vertical direction. Accordingly, the distance between the surface of the metal separator 14 and the imaging device 46 at the imaging position of the imaging device 46 is maintained at an appropriate focal length. That is, focusing of the imaging device 46 is not necessary, the speed of movement of the metal separator 14 can be increased, and inspection of the weld portion 34 along the weld line 36 can be performed quickly.

Second Embodiment

Hereinafter, an inspection apparatus 40A according to the second embodiment will be described with reference to FIG. 6. In the inspection apparatus 40A, the same components as those of the inspection apparatus 40 of FIG. 3 are denoted by the same reference numerals, and detailed description thereof will be omitted.

Figure 6:
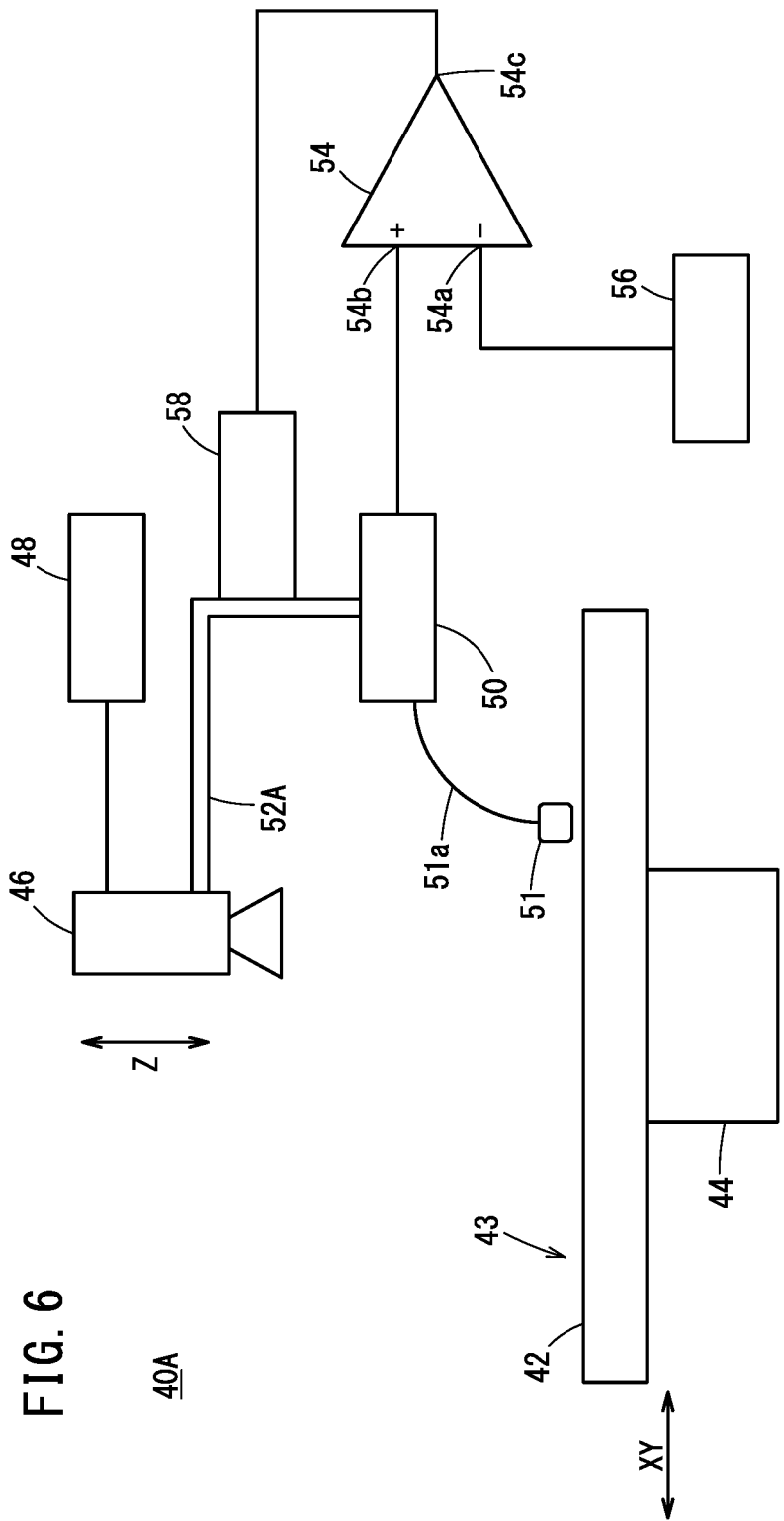
FIG. 6 is a schematic configuration diagram of a metal separator inspection apparatus according to the second embodiment.

As shown in FIG. 6, the inspection apparatus 40A has a frame 52A that supports the imaging device 46 and the height detector 50. The frame 52A is supported by an imaging device driving unit 58. The imaging device driving unit 58 displaces the imaging device 46 and the height detector 50 in the vertical direction (arrow Z direction) together with the frame 52A. In the inspection apparatus 40A of the present embodiment, the stage driver 44 moves the stage 42 only horizontally, and the stage 42 is not displaced vertically.

An output terminal of the height detector 50 is input to the non-inverting input terminal of the height control circuit 54. The output terminal 54c of the height control circuit 54 is connected to an imaging device driving unit 58. The imaging device driving unit 58 changes the height of the imaging device 46 in accordance with the control signal of the height control circuit 54. When the height of the imaging portion increases due to the deflection of the metal separator 14, the detection value of the height detector 50 increases. As the detection value of the height detector 50 increases, the height control circuit 54 increases the value of the control signal, and the imaging device driving unit 58 raises the position of the imaging device 46. Further, in a case where the distance between the imaging device 46 and the imaging portion of the metal separator 14 increases, the detection value of the height detector 50 decreases. As the detection value of the height detector 50 decreases, the output value of the height control circuit 54 decreases. As a result, the imaging device driving unit 58 lowers the position of the imaging device 46. Through the operation described above, during the visual inspection, the inspection apparatus 40A maintains an appropriate focal distance between the imaging device 46 and the imaging portion of the metal separator 14.

Other Embodiments

Figure 7:
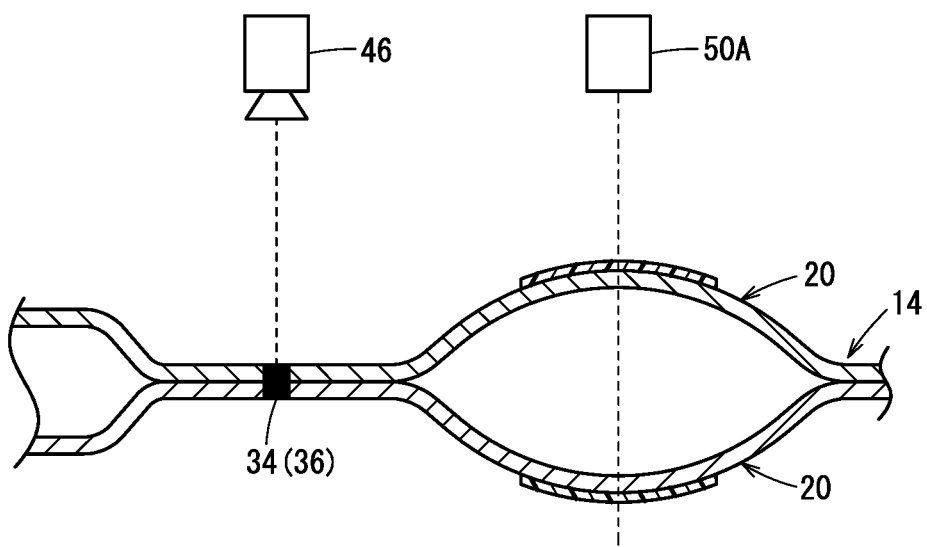
FIG. 7 is an explanatory diagram showing a modification of the height detector.

Although the height detector 50 described in the above embodiment is a contact-type sensor that works in a manner that the contact 51 abuts on the top portion of the bead seal 20, the present invention is not limited thereto. For example, a height detector 50A shown in FIG. 7 may be employed. The height detector 50A is a non-contact sensor that detects the height of the top portion of the bead seal 20 in a non-contact manner. As the non-contact sensor, a laser displacement meter, a proximity sensor, a visible light displacement sensor, an ultrasonic sensor, an eddy current displacement sensor, or the like can be used.

Alternatively, instead of the stage 42, the imaging device 46 and the height detector 50 may be moved along the weld line 36.

The inspection method and the inspection apparatus 40, 40A for the metal separator 14 described above have the following effects.

The method for inspecting the metal separator 14 is a method for inspecting the separator 14 that is formed by the first separator 14a and the second separator 14c welded to each other, the method including step S10 of positioning the imaging portion of the imaging device 46 at the weld portion 34 of the metal separator 14; step S20 in which the height detector 50 detects deflection of the metal separator 14 in the vicinity of the imaging portion of the imaging device 46, and the driving device (for example, the stage driver 44 or the imaging device driving unit 58) displaces the metal separator 14 or the imaging device 46 in the height direction according to the deflection of the metal separator 14, whereby the distance between the imaging device 46 and the imaging portion of the metal separator 14 is kept constant; and step S30 of imaging the weld portion 34 with the imaging device 46.

According to the above-described method for inspecting the metal separator 14, the distance between the imaging device 46 and the imaging portion of the metal separator 14 can be kept constant using the detection result of the height detector 50. For this reason, even if the metal separator 14 is bent, focusing of the imaging device 46 becomes unnecessary. As a result, inspection of the metal separator 14 can be performed more quickly, and productivity is improved.

In the method for inspecting the metal separator 14 described above, the metal separator 14 is stacked on an membrane electrode assembly (for example, MEA 12) of a fuel cell to constitute the power generating cell 10, and has, on its surface, the bead seal 20 formed in a convex shape to abut on the electrolytic membrane to prevent gas leakage. The height detector 50 detects the height of the bead seal 20 to detect deflection of the metal separator 14 in the vicinity of the imaging device 46. In the metal separator 14, the bead seal 20 is formed with high accuracy in order to prevent gas leakage, and the height of the bead seal 20 accurately reflects the deflection of the metal separator 14. In this method, the height of the bead seal 20 is detected by the height detector 50, whereby the deflection of the metal separator 14 can be detected with high accuracy.

In the method for inspecting the metal separator 14, the stage device 43 that supports the metal separator 14 moves the metal separator 14 in manner that the imaging position of the imaging device 46 is along the weld line in which the weld portion 34 is arranged on the metal separator 14 in the form of a line, the driving device maintains, which the stage device 43 moves the metal separator 14, a distance between the imaging device 46 and the imaging portion of the metal separator 14 constant based on the deflection detection result of the height detector 50. According to this method, the inspection of the weld portion 34 can be performed along the weld line 36 with the imaging device 46, and the inspection can be efficiently performed.

The apparatus 40, 40A for inspecting the metal separator 14 according to the present embodiment includes the stage device 43 that supports the metal separator 14 of the fuel cell, the imaging device 46 that images the weld portion 34 of the metal separator 14, the height detector 50 that detects the height of the deflection in the vicinity of the weld portion 34 on the metal separator 14, and a driving mechanism (for example, the stage driver 44 or the imaging device driving unit 58) displaces the stage device 43 or the imaging device 46 in the height direction in accordance with the detection result of the height detector 50 so as to maintain constant between the imaging device 46 and the weld portion 34.

In the apparatus 40, 40A for inspecting the metal separator 14 described above, the metal separator 14 is stacked on a membrane electrode assembly (for example, MEA 12) of a fuel cell to constitute the power generating cell 10, and has, on a surface of the metal separator 14, the bead seal 20 formed in a convex shape for preventing leakage of gas by abutting on the electrolytic membrane. The height detector 50 may detect deflection of the metal separator 14 in the vicinity of the imaging portion of the imaging device 46 by detecting the height of the bead seal 20. According to this configuration, the deflection of the metal separator 14 can be accurately detected based on the height of the bead seal 20 accurately formed on the metal separator 14.

In the apparatus 40, 40A for inspecting the metal separator 14 described above, the height detector 50 may be a contact-type sensor abutting on the bead seal 20. Since the bead seal 20 protrudes high on the metal separator 14, the height of the bead seal 20 can be reliably detected by the contact sensor.

In the apparatus 40, 40A for inspecting the metal separator 14 described above, the height detector 50 may be a non-contact sensor that detects deflection of the metal separator 14 in a non-contact manner. According to this configuration, the deflection of the metal separator 14 can be directly detected not only from the height of the bead seal 20 but also from the height of the imaging portion.

Although the present invention has been described with reference to preferred embodiments, it is needless to say that the present invention is not limited to the above-described embodiments and various modifications can be made without departing from the spirit of the present invention.

What is claimed is:

1. A method for inspecting a metal separator that is formed by a first separator and a second separator welded to each other, the method comprising:
    a step of positioning an imaging portion of an imaging device at a weld portion of the metal separator;
    a step in which a height detector detects deflection of the metal separator in the vicinity of an imaging portion of the imaging device, and a driving device displaces the metal separator or the imaging device in a height direction according to the deflection of the metal separator, whereby a distance between the imaging device and the imaging portion of the metal separator is kept constant; and
    a step of imaging the weld portion with the imaging device.

2. The method according to claim 1,
    wherein the metal separator is stacked on a membrane electrode assembly of a fuel cell to form a power generating cell,
    the metal separator includes a bead seal formed in a convex shape on a surface of the metal separator, the bead seal coming into contact with the membrane electrode assembly to prevent leakage of gas,
    the height detector detects the height of the bead seal to detect deflection of the metal separator in the vicinity of the imaging device.

3. The method according to claim 1,
    wherein a stage device that supports the metal separator moves the metal separator such that an imaging position of the imaging device is along a weld line in which the weld portion is arranged on the metal separator in the form of a line, and
    the driving device keeps a distance between the imaging device and the imaging portion of the metal separator constant based on a deflection detection result of the height detector while the stage device moves the metal separator.

* * * * *